July 10, 1962 S. H. PATTEN ET AL 3,043,710
FLUORESCENT SCREENS
Filed Feb. 20, 1959

- 2 PHOSPHOR IN POLYVINYL BUTYRAL BINDER
- 1 FLEXIBLE SUPPORT

- 2
- 3 REFLECTIVE PIGMENT LAYER
- 1

- 4 PROTECTIVE LAYER
- 2
- 1

- 4
- 2
- 3
- 1

INVENTORS
STANLEY HANCOCK PATTEN
ARNOLD R. KUNES

BY Francis A. Painter

AGENT 3,043,710
FLUORESCENT SCREENS
Stanley Hancock Patten and Arnold R. Kunes, Towanda, Pa., assignors to E. I. du Pont de Nemours and Company, Wilmington, Del., a corporation of Delaware
Filed Feb. 20, 1959, Ser. No. 794,520
15 Claims. (Cl. 117—33.5)

This invention relates to fluorescent screens and more particularly to fluoroscopic screens and intensifying screens for radiographs. Still more particularly it relates to flexible fluoroscopic and X-ray intensifying screens that do not discolor with age having an improved dimensionally stable binding agent. Still more particularly it relates to such screens wherein the binding agent for the phosphor particles comprises polyvinyl butyral.

In the manufacture of fluoroscopic and X-ray intensifying screens the phosphor, e.g., barium lead sulfate, etc., is dispersed in a polymeric binder (usually a plasticized cellulose derivative) in a ratio as high as 12–20 parts of phosphor to 1 part, by weight, of binder. The purpose of the high phosphor concentration is to obtain maximum screen brightness for increased speed and improved definition and detail in radiographs obtained by the use of such screens. The high concentrations of cellulose and equivalent binders result in a brittle coating of phosphor. The brittle coating, in turn, requires a rigid (usually cardboard) support to resist excessive flexing and thus prevent cracking of the coating. Due to the rigidity of the composite screen structure, it is difficult to obtain intimate and uniform contact between the surfaces of the intensifying screen and photographic film. Such contact is necessary to obtain image detail needed in diagnostic work. This lack of contact becomes more evident and objectionable as the size of the screen is increased, due to warping, curling, etc. of the support, resulting in a nonplanar surface.

Intensifying screens, in many instances, are also effected by changes in relative humidity and temperature, i.e., the screens swell or shrink and do not possess good dimensional stability.

An object of this invention is to provide improved fluoroscopic and X-ray intensifying screens. Another object is to provide such screens that do not discolor on aging. A further object is to provide such screens that are hard, durable and dimensionally stable. A still further object is to provide such screens which have good adhesion between layers. Other objects will appear hereinafter.

These and other objects are accomplished in accordance with this invention which provides a fluorescent screen comprising a support bearing at least one flexible layer of finely divided particles of a phosphor dispersed in a polyvinyl butyral binder. The improved screens do not discolor upon aging, and are hard, durable and exhibit excellent dimensional stability under extreme conditions of high and low relative humidity and temperature.

The phosphor layer can be coated directly on the surface of the support or on a substratum, e.g., a layer containing light-reflecting pigment particles, on the support. A protective coating such as that described in assignee's application of Patten, Serial No. 656,807, filed May 3, 1957, U.S. Patent 2,907,882, issued October 6, 1959, may be coated over the phosphor-binder layer.

Fluorescent screens of the invention are shown in the attached drawing which constitutes a part of this application. Referring now to the drawing.

Figure 1:
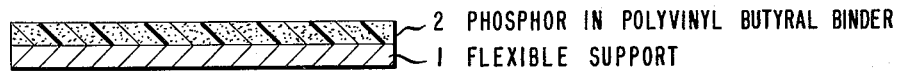
FIG. 1 is a cross-sectional view of a fluorescent screen of the present invention.

The invention in its simplest form represented by FIG. 1 comprises a support layer 1 with a layer of phosphor 2 dispersed in a polyvinyl butyral binder superimposed thereon. The support layer can be paper or a metal foil, e.g., aluminum, but is preferably composed of a macromolecular, hydrophobic polymer. Suitable polymeric supports include cellulose derivatives, e.g., cellulose acetate, cellulose propinate, cellulose acetate propinate, cellulose acetate butyrate, ethyl cellulose; polyethylene, polyvinyl chloride, poly(vinyl chloride co vinyl acetate); vinylidene chloride, vinyl acetate, acrylonitrile, styrene and isobutylene; polystyrene and polyesters, e.g., polyethylene terephthalates and homologous polyesters obtainable by the process described in Whinfield et al. U.S. Patent 2,465,319. Very thin polyethylene terephthalate films are particularly useful. Other especially useful supports are the vinylidene chloride copolymer coated supports of Alles et al. U.S. Patent 2,627,088. The thickness of the support may be anywhere from 0.25 to 30 mils in thickness but a thickness of 10 mils is particularly preferred.

The superimposed layer of phosphor dispersed in a polyvinyl butyral binder can contain from 4 to 20 percent polyvinyl butyral based on the weight of the phosphor. An amount of from 5 to 8 percent of polyvinyl butyral is preferred. This layer can be from 1 to 20 mils in thickness but is preferably 4 to 14 mils thick when dry.

Figure 2:
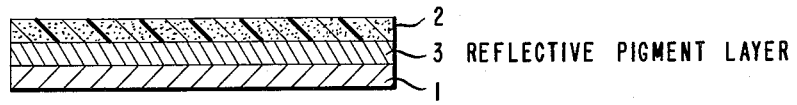
FIGS. 2, 3 and 4 are cross-sectional views of modified screens of the invention.

An optional modification of this invention represented by FIG. 2 comprises inclusion of a thin reflective layer 3 between the support 1 and the phosphor-binder layer 2. The reflective layer comprises a pigment, preferably magnesium oxide, in binder, e.g., polyvinyl butyral or a chlorosulfonated polyethylene of the type disclosed in U.S. Patent 2,819,183. The reflective layer can be from 0.3 to 1 mil or more in thickness.

Figure 3:
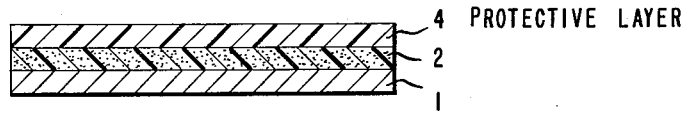

A preferred optional modification of this invention represented by FIG. 3 comprises superimposing a protective layer 4 on the phosphor-binder layer 2. The protective layer can be cellulose nitrate or acetate but is preferably a mixture of resins comprising poly (methyl methacrylate), poly (isobutyl methacrylate) and a vinyl chloride/vinyl acetate copolymer; an amplifying description is contained in assignee's application of Patten, Serial No. 656,807, filed May 3, 1957, U.S. Patent 2,907,882, issued October 6, 1959. This layer can be from about 0.5 to 1.5 mils in thickness.

Figure 4:
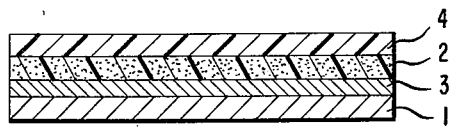

A further optional modification of this invention represented by FIG. 4 comprises the utilization of both the reflective layer 3 and the protective layer 4 in the same structure occupying their same relative positions as described in the previous modifications.

All the layers, other than the support layer, are coated as liquids and are preferably dried at an elevated temperature to the preferred thickness. It is to be understood that both the reflective and the protective layers are optional features not necessary for the operation of the invention and either or both can be included or omitted as may be desirable under the circumstances.

The invention will be further illustrated by, but is not limited to the following examples:

*Example I*

A 10 mils thick sheet of biaxially oriented polyethylene terephthalate film coated on one surface with a substratum of poly(vinylidene chloride co methyl acrylate co itaconic acid) was prepared as described in Alles et al., U.S. Patent 2,698,240. The film was placed uncoated side down on a glass plate which was wet with water. The copolymer surface of the film was coated with a reflective layer of the following solution which had been milled previously for 24 hours:

| | Grams |
|---|---|
| Magnesium oxide (U.S.P., heavy grade) | 800 |
| Mixed petroleum naphtha, IBP 247° F.; API grade (at) 60° F. of 59–61; specific gravity 0.7385 | 1350 |
| N-butyl acetate | 1300 |
| Polymeric organic silicone fluid, 2% by weight in toluene; specific gravity 0.964–0.969 at 20° C.; viscosity at 25° C. 4 to 40 centistokes, determined with Ostwald viscosimeter | 20 |
| Chlorosulfonated polyethylene | 400 |
| Dioctyl ester of sodium sulfosuccinic acid | 16 |
| Stearic acid | 8 | to provide a dry thickness of 0.6 mil. On the dry reflective layer there was coated the following solution which had been milled previously for 24 hours:

| | Grams |
|---|---|
| N-butyl acetate | 891.5 |
| Ethanol | 222.9 |
| Polymeric organic silicone fluid, 2% by weight in toluene as described above | 23.4 |
| Potassium salt of monoethylphenylphenol monosulfonic acid | 6.2 |
| Glycerol monolaurate | 15.6 |
| Polyvinyl butyral (granular, intrinsic viscosity 0.81) | 156.0 |
| Barium sulfate/lead sulfate phosphor | 2080.0 | to provide a dry thickness of 7 mils. On the dried phosphor dispersion layer there was coated the following solution:

| | Grams |
|---|---|
| Poly(methyl methacrylate) (as a 40% solution in methyl ethyl ketone) | 105 |
| (96/100) vinyl chloride/vinyl acetate copolymer | 84 |
| Poly(isobutyl methacrylate) | 42 |
| Methyl ethyl ketone | 658 |
| Acetone | 311 |
| Polymeric organic silicone fluid, 2% by weight in toluene described above | 3 | to provide a protective layer having a thickness of 0.5 mil.

*Example II*

Example I was repeated except that on the dry reflective layer was coated the following solution, milled as described in Example I:

| | Grams |
|---|---|
| Barium sulfate/lead sulfate phosphor | 500 |
| Polyvinyl butyral (high molecular weight, intrinsic viscosity 1.16) | 34 |
| Toluene | 214 |
| N-propanol | 92 |
| Ethanol | 20 |
| Triethylene glycol (2-ethyl-butyrate) | 10 |
| Potassium salt of monoethylphenylphenol mono-sulfonic acid | 0.5 | to provide a dry thickness of 7 mils.

*Example III*

Example I was repeated except that on the dry reflective layer was coated the following solution which had been milled previously for 16 hours:

| | Grams |
|---|---|
| Barium sulfate/lead sulfate phosphor | 1800 |
| Polyvinyl butyral (medium molecular weight, intrinsic viscosity 0.81) | 144 |
| N-propanol | 406 |
| N-butyl acetate | 406 |
| Ethanol | 72 |
| Polymeric organic silicone fluid, 2% by weight in toluene as described in Example I | 20.6 |
| Potassium salt of monoethylphenylphenol mono-sulfonic acid | 2.06 | to provide a dry thickness of 5.5 mils.

*Example IV*

Example I was repeated except that on the dry reflective layer there was coated the following solution which had been placed in a bottle and the latter rolled for 21 hours:

| | Grams |
|---|---|
| Phosphor-zinc sulfide, silver activated (0.028% silver), magnesium and barium chloride fluxed | 800 |
| N-butyl acetate | 342.5 |
| Ethanol | 81.9 |
| Polymeric organic silicone fluid, 2% by weight in toluene as described in Example I | 9.0 |
| Potassium salt of monoethylphenylphenol monosulfonic acid | 1.6 |
| Glycerol monolaurate | 6.0 |
| Polyvinyl butyral, medium molecular weight (intrinsic viscosity 0.81) | 60.0 | to provide a dry thickness of 9 mils. The resultant screen is useful for radiography.

*Example V*

Example IV was repeated except that the phosphor dispersion was milled for 3 hours and coated to give a dry thickness of 7.0 mils over a 0.7 mil dry reflective layer (10 mils when wet) of the following solution:

| | Grams |
|---|---|
| Magnesium oxide | 64.0 |
| Stearic acid | 6.4 |
| Dioctyl ester of sodium sulfosuccinic acid | 16.0 |
| Titanium dioxide, rutile pigment grade | 800.0 |
| Mixed petroleum naphthas as described in Example I | 840.0 |
| N-butyl acetate | 824.0 |
| Polymeric organic silicone fluid, 2% by weight in toluene as described in Example I | 16.0 |
| Chlorosulfonated polyethylene | 320.0 | to which, after the above solution had been milled for 24 hours, was added 32.0 grams of the following slurry:

| | Grams |
|---|---|
| 2-mercaptoimidazoline | 200.0 |
| Dioctyl ester of sodium sulfosuccinic acid | 2.5 |
| N-butyl acetate | 797.5 |

The solution mixture was milled for one hour immediately prior to use.

*Example VI*

A polyethylene terephthalate film as described in Example I was coated with the titanium dioxide reflective layer described in Example V. Over this reflective layer was coated a phosphor dispersion layer at 40 mils to give a dry thickness of 14 mils, as follows:

| | Grams |
|---|---|
| Zinc cadmium sulfide phosphor | 3400 | and 1833 grams of a binder solution consisting of:

| | Grams |
|---|---|
| Ethanol | 7360.0 |
| N-butyl acetate | 3144.0 |
| Polymeric organic silicone fluid, 2% by weight in toluene | 242.6 |
| Potassium salt of monoethylphenylphenol monosulfonic acid | 64.7 |
| Glycerol monolaurate | 161.7 |
| Sulfonated castor oil | 410.0 |
| Polyvinyl butyral, medium weight (intrinsic viscosity 0.81) | 1617.0 | which was placed in a bottle and the latter rolled for 18 hours prior to use.

All the screens described in the foregoing examples had satisfactory flexibility and the adherence of the phosphor containing layer to the surface of the support was adequate. In addition the screens did not discolor on aging and had hard, scratch-resistant, durable surfaces and exhibited excellent dimensional stability under extreme conditions of high and low relative humidity and temperature. The luminescence of the screens was equal to that of conventional screens in light emission and the contact between the screens and photographic films was improved over the conventional screens.

In making the fluoroscopic and intensifying screens of this invention, the phosphor particles are dispersed in a suitable organic solvent including hydrocarbons, e.g., toluene, benzene, tetrahydronaphthalene and decahydronaphthalene; alcohols, e.g., ethanol, n-propanol, butanol; or esters, e.g., n-butyl acetate, ethyl acetate, n-propyl acetate; or ethers, e.g., dioxane, ethyl and methyl Cellosolve. Isophorone is a useful solvent as are toluene-alcohol mixtures and n-butyl acetate with napthas or alcohols. If desired, with the aid of a dispersing agent, e.g., potassium salt of monoethylphenylphenol monosulfonic acid, dioctyl ester of sulfosuccinic acid and mixtures of the latter with stearic acid, the dispersion is then mixed with the other components of the phosphor-binder dispersion, the resulting solution is coated onto a reflecting layer on the support or directly on the support and the solvents are removed, e.g., by evaporation at room temperature or at an elevated temperature.

The phosphor particles may range in size preferably from approximately 4 to 40 microns in average diameter. Smaller or larger phosphor particles may be utilized, however, if the phosphor-binder ratio is adjusted. In order that the phosphor particles will be of fine particle size and free from agglomerates and slugs of polymer binding agent the dispersion may be milled, e.g., by means of a colloid mill or ball mill and then passed through a fine mesh screen, filter cloth or felt. The phosphor layer may vary in thickness when wet from 10 mils or less up to about 60 mils. The dry thickness may range from 1 to 20 mils, preferably 4 to 14 mils. The thinner coatings produce low X-ray adsorption screens with fine definition, while the heavier coatings produce screen with greater speed.

The types of phosphor which are particularly useful in the preparation of the screens include: calcium tungstate, zinc sulffide, zinc cadmium sulfide, zinc orthosilicate and barium sulfate/lead sulfate. The invention, however, should not be limited to these phosphors as other phosphors known in the art are also applicable.

Various adjuvants may be admixed with the phosphor-polyvinyl butyral dispersion. Among such adjuvants are: a polymeric silicone fluid (2% by weight in toluene) as described in Example I, triethylene glycol-di(2-ethylhexoate), triethylene glycol-di(2-ethylbutyrate), glycerol monolaurate, pentaerythritol tetracetate, di-butyl phthalate, di-butyl sebacate, butyl ricinoleate and castor oil plasticizers. In general, the added resins should constitute not more than 50% by weight of the polyvinyl butyral polymer.

The polyvinyl butyral polymer useful as the binding agent is available from commercial sources. The polyvinyl butyral utilized to make the screens may be granular and of high, medium or low molecular weights. The intrinsic viscosity of the polyvinyl butyral may range from about 0.75 to 1.25 and is determined by the ethanol solution method described by Billmeyer, F. W., Textbook of Polymer Chemistry, pp. 128–131, Interscience Publishers, Inc., 1957. The polyvinyl butyral may contain up to about 20% intralinear vinyl alcohol units

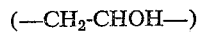

(—CH₂-CHOH—)

and up to 3% vinyl ester groups e.g., vinyl acetate, vinyl propionate, vinyl chloroacetate, etc. Thus, when a completely or partially hydrolyzed polyvinyl ester is used the acetal-forming or condensation reaction need not always be complete. Thus, polyvinyl butyrals with varying viscosities depending on the average molecular weight and composition may be obtained with from 80 to 86% polyvinyl butyral, 9 to 19% polyvinyl alcohol and from 0.3 to 2.5% polyvinyl acetate. It is to be understood that the invention is not limited by these particular polyvinyl butyral concentrations as other polymers predominating in vinyl butyral groups may be used.

The amount of polyvinyl butyral in the phosphor-binder dispersion may range from about 4 to 20% by weight based on the weight of the phosphor, preferably 5 to 8% polyvinyl butyral by weight. It is preferred, that the binder proportion in the phosphor-binder layer be kept at a minimum to insure best screen performance radiologically. The amount of binder may be increased to about 40%, however, in certain embodiments by using a low viscosity, i.e., a low molecular weight, polyvinyl butyral.

As stated above in the fluorescent screens of this invention, the thickness of the support may vary from 0.25 to 30 mils depending upon the material chosen. While the adhesion of the phosphor-binder layer to the base support is adequate, adhesion can be improved if a reflective layer containing, e.g., MgO, is coated on the base. In addition adhesive materials may be combined with the reflective layer to improve the adhesion of the active layer to the support. Examples of adhesive materials include: polybutyl acrylate, polyisobutyl acrylate, poly-2-ethylhexylacrylate, copolyesters and polyesters composed of the esterification product of a glycol of 2 to 10 carbons and a mixture of esters of (a) hexahydroterephthalic, terephthalic and sebacic acids, (b) terephthalic, isophthalic and sebacic acids and (c) terephthalic and sebacic acids and of esters of (d) hexhaydroterephthalic acid.

The support or film base, moreover, may contain or be coated with dyes or finely divided pigments, e.g., TiO₂, magneisum oxide, lithopone, magnesium carbonate, aluminum oxide, carbon black and colored pigments, e.g., Tartrazine (C.I. No. 640), Victoria Green W.B. Base (C.I. No. 657), Chinoline Yellow D [soluble in spirits] (C.I. No. 800) and Nubian Resin Black (C.I. No. 864), as opacifying or light-absorbing agents. In addition, the base support may be metallized to provide reflective action, e.g., the polyethylene terephthalate base can be coated by a thin layer of aluminum, etc. The thickness of the reflective pigment coating can range from about 0.3 mil to 1 mil or more. The above-mentioned dyes and pigments are particularly useful in reflective layers to vary light output or block unwanted wave lengths. For example, the emission of barium sulfate/lead sulfate phosphor, under 80 kvp. X-ray excitation is largely in the ultraviolet and a pigment which will reflect efficiently in this band, e.g., magnesium oxide or magnesium carbonate, is desirable in the reflecting layer. In another illustration, maximum reflecting efficiency in the visible green-yellow band of the spectrum is desirable in the reflecting pigment layer used with zinc cadmium sulfide phosphors in fluoroscopic screens. Titanium dioxide is, therefore, used to bring about the desired result.

A protective layer may be coated on the phosphor-binder dispersion layer. Preferably the protective coating is of the type described in assignee's application of Patten, Serial No. 656,807, filed May 3, 1957, U.S. Patent 2,907,882, issued October 6, 1959, but thin cellulose acetate and cellulose nitrate films can also be used. Generally the protective layer varies in dry thickness from 0.5 to 1.5 mils.

In making the various coatings described in the examples, a doctor blade coating apparatus similar to that shown on page 256, FIGURE 116, of Gardner, Physical and Chemical Examination of Paints, Varnishes, Lacquers and Colors, Ed. VII; October 1935, was used.

The flexible fluorescent screens of this invention are useful for medical and industrial radiography, e.g., miniature radiographic screens, fluoroscopy; and in industrial monitoring systems. They are particularly suited for industrial radiology where it is desirable to bend a cassette or photographic film holder around the part or object to be radiographed.

The flexible screen having the phosphor layer on a clear or opaque support may be coated, on the phosphor surface, with a pressure-sensitive adhesive and the resultant coated screen laminated to a photographic film for improved contact. Where an opaque support is used the combination can be handled in daylight. After exposure, the screen is stripped from the film and reused or discarded.

By using a light-opaque film support, paper, or foil for the polyvinyl butyral-containing fluorescent screens of the examples, a daylight photographic film can be made by applying a sheet to both surfaces of the photographic film with sufficient overlay at the edges to make it light-tight. Optionally, the edges can be cemented or heat sealed.

Another useful aspect of this invention embodies a composite photographic film and intensifying screen. In such structures the photographic element comprises a sheet support, a phosphor-polyvinyl butyral layer and a contiguous light-sensitive silver halide layer, e.g., silver chloride, silver-bromide-chloride, or silver bromoiodide. A substratum layer can be coated on the phosphor-binder layer to aid adhesion to the light-sensitive layer.

The fluoroscopic and intensifying screens of the instant invention, due to the novel polyvinyl butyral binder composition, do not discolor upon aging and are hard, durable, exhibit excellent dimensional stability under extreme conditions of high and low relative humidity and temperature. In addition, the binder has excellent short wave length light transmission, giving optimum speed for the particular phosphors employed. The binder is easily dissolved by organic solvents, has good viscosity characteristics and does not affect the fluorescence of the phosphors. Still other advantages will be apparent to those skilled in the art.

What is claimed is:

1. A fluorescent screen comprising a supporting film of a macromolecular hydrophobic polymeric material bearing on one surface a flexible layer of finely divided particles of a phosphor dispersed in a polyvinyl butyral binder, said binder being present in said flexible layer in an amount of 4 to 20 percent by weight based on the weight of the phosphor particles.

2. A screen as defined in claim 1 wherein the supporting film consists of a polyethylene terephthalate film.

3. A screen as defined in claim 1 wherein said supporting film has a thickness of from 0.25 to 30 mils and said flexible layer has a thickness of from 1 to 20 mils.

4. A screen as defined in claim 1 wherein the polyvinyl butyral binder is present in the flexible layer from 5 to 8 percent by weight based on the weight of the phosphor particles.

5. A screen as defined in claim 1 wherein the flexible polyvinyl butyral binder layer contains up to 50 percent by weight based on the weight of the polyvinyl butyral of a non-volatile ester plasticizing agent.

6. A screen as defined in claim 5 wherein said plasticizing agent is glycerol monolaurate.

7. A fluorescent screen comprising a supporting film of a macromolecular polyester material bearing a reflective pigment layer on one surface with a flexible layer thereover of finely divided particles of a phosphor dispersed in a polyvinyl butyral binder, said binder being present in said flexible layer in an amount of 4 to 20 percent by weight based on the weight of the phosphor particles.

8. A fluorescent screen comprising a supporting film of a macromolecular polyester material bearing on one surface a flexible layer of finely divided particles of a phosphor dispersed in a polyvinyl butyral binder having a protective layer thereover, said binder being present in said flexible layer in an amount of 4 to 20 percent by weight based on the weight of the phosphor particles.

9. A fluorescent screen comprising a supporting film of a macromolecular polyester material bearing a reflective pigment layer on one surface with a flexible layer thereover of finely divided particles of a phosphor dispersed in a polyvinyl butyral binder having a protective layer thereover, said binder being present in said flexible layer in an amount of 4 to 20 percent by weight based on the weight of the phosphor particles.

10. A screen as described in claim 9 wherein the supporting film consists of a polyethylene terephthalate film.

11. A screen as described in claim 9 wherein the supporting film has a thickness of from 0.25 to 30 mils, the reflective pigment layer has a thickness of from 0.3 to 1 mil, the flexible layer has a thickness of from 4 to 14 mils and the protective layer has a thickness of from 0.5 to 1.5 mils.

12. A screen according to claim 9 wherein the supporting film is coated with a layer of poly(vinylidene chloride co methyl acrylate co itaconic acid) on the surface beneath the reflective pigment layer.

13. A screen as defined in claim 9 wherein the flexible polyvinyl butyral binder layer contains up to 50 percent by weight based on the weight of the polyvinyl butyral of a non-volatile ester plasticizing agent.

14. A screen as defined in claim 13 wherein said plasticizing agent is glycerol monolaurate.

15. A fluorescent screen comprising a supporting film of a macromolecular polyester material bearing a reflective pigment layer on one surface with a flexible layer thereover of finely divided particles of a barium sulfate/lead sulfate phosphor dispersed in a polyvinyl butyral binder having a protective layer thereover, said binder being present in said flexible layer in an amount of 4 to 20 percent by weight based on the weight of the phosphor particles and containing up to 50 percent by weight based on the weight of the polyvinyl butyral of glycerol monolaurate.

References Cited in the file of this patent

UNITED STATES PATENTS

| | | |
|---|---|---|
| 2,310,740 | Leavy | Feb. 9, 1943 |
| 2,372,903 | Lynch | Apr. 3, 1945 |
| 2,375,177 | Reese | May 1, 1945 |
| 2,409,548 | Debacher | Oct. 15, 1946 |
| 2,417,383 | Switzer | Mar. 11, 1947 |
| 2,517,218 | Lawrence | Aug. 1, 1950 |
| 2,698,240 | Alles et al. | Dec. 28, 1954 |
| 2,907,882 | Patten | Oct. 6, 1959 |

FOREIGN PATENTS

| | | |
|---|---|---|
| 719,600 | Great Britain | Dec. 1, 1954 |

OTHER REFERENCES

"Handbook of Plastics," 2nd Edition (Simonds et al.), D. Van Nostrand Co., Inc. (N.Y.), 1949, pages 239, 240 and 344 relied on.